US012712309B2

(12) United States Patent
Satagaj et al.

(10) Patent No.: US 12,712,309 B2
(45) Date of Patent: Aug. 18, 2026

(54) WALL PLATE WITH PEST ABATEMENT CIRCUITRY

(71) Applicant: Big Bug Solutions, LLC, Canton, GA (US)

(72) Inventors: Thomas Satagaj, Bellevue, WA (US); Daniel Jacobson, Canton, GA (US)

(73) Assignee: Big Bug Solutions LLC, Alpharetta, GA (US)

( * ) Notice: Subject to any disclaimer, the term of this patent is extended or adjusted under 35 U.S.C. 154(b) by 241 days.

(21) Appl. No.: 18/409,769

(22) Filed: Jan. 10, 2024

(65) Prior Publication Data

US 2024/0235094 A1 Jul. 11, 2024

Related U.S. Application Data

(60) Provisional application No. 63/479,343, filed on Jan. 10, 2023.

(51) Int. Cl.
*H01R 13/447* (2006.01)
*A01M 25/00* (2006.01)
*A01M 31/00* (2006.01)

(52) U.S. Cl.
CPC ........... *H01R 13/447* (2013.01); *A01M 25/00* (2013.01); *A01M 31/002* (2013.01)

(58) Field of Classification Search
CPC ... A01M 25/00; A01M 31/002; H01R 13/447; H01R 13/6691; H01R 13/7175; H01R 13/6683; H01R 25/006
See application file for complete search history.

(56) References Cited

U.S. PATENT DOCUMENTS

| | | | | | |
|---|---|---|---|---|---|
| 2,229,300 | A | * | 1/1941 | Montroy | A01M 23/38 43/98 |
| D267,226 | S | * | 12/1982 | Oster | D8/353 |
| 4,514,789 | A | * | 4/1985 | Jester | H01H 9/182 362/276 |
| 4,884,064 | A | * | 11/1989 | Meehan | G08B 21/18 340/573.2 |
| 4,897,049 | A | * | 1/1990 | Miller | H01R 25/006 439/652 |
| 5,027,547 | A | * | 7/1991 | Livshin | A01M 23/24 43/124 |
| 5,040,326 | A | * | 8/1991 | Van Dijnsen | A01M 23/12 43/65 |

(Continued)

OTHER PUBLICATIONS

Original and Translation of CN107247422 (Year: 2017).*

(Continued)

*Primary Examiner* — Timothy J. Dole
*Assistant Examiner* — Muhammed Azam
(74) *Attorney, Agent, or Firm* — 24HourIP, PLLC

(57) ABSTRACT

A wall plate with pest abatement circuitry includes a wall plate portion structured to cover an electrical box. The wall plate portion is formed substantially from a plastic material, and it has an inner surface and an outer surface. The inner surface is adjacent to an inside volume of the electrical box when the wall plate with pest abatement circuitry is deployed. The wall plate also includes a hosting platform proximate the inner surface of the wall plate. The hosting platform is arranged to stage the pest abatement circuitry.

20 Claims, 8 Drawing Sheets

(56) References Cited

U.S. PATENT DOCUMENTS

H998 H * 12/1991 Gerharz ................ A01M 29/26 116/22 A
5,269,091 A * 12/1993 Johnson ................ A01M 23/38 43/112
5,473,836 A * 12/1995 Liu ......................... A01M 1/24 116/22 A
5,815,090 A * 9/1998 Su ........................ A01M 1/2011 43/132.1
6,195,932 B1 * 3/2001 Aicher .................... A01M 1/04 43/112
6,198,046 B1 * 3/2001 Moodie .................... H02G 3/14 174/67
6,445,301 B1 * 9/2002 Farrell ................ A01M 31/002 340/567
6,519,208 B2 * 2/2003 DeVries ................. G04G 15/00 368/10
6,594,947 B2 * 7/2003 Lingren ................ A01M 29/12 43/114
6,714,725 B2 * 3/2004 Grone ....................... A61L 9/03 392/390
6,792,395 B2 * 9/2004 Roberts ............... A01M 31/002 379/39
6,832,794 B2 * 12/2004 He ........................... A61L 9/03 392/395
6,916,989 B2 * 7/2005 Broussard, Jr. .......... H02G 3/14 174/67
6,977,341 B1 * 12/2005 Gustaveson, II .... H05K 5/0208 174/67
7,212,112 B2 * 5/2007 Barber ................ A01M 31/002 43/132.1
7,229,322 B2 * 6/2007 Bangert ............... H01R 25/003 439/652
7,394,019 B2 * 7/2008 Gesue .................... H02G 3/121 174/67
7,394,389 B2 * 7/2008 Nelson ................ A01M 31/002 340/573.2
7,398,013 B2 * 7/2008 He ...................... A01M 1/2077 392/394
7,411,497 B2 * 8/2008 Kates ................... G08B 13/184 340/556
7,509,770 B2 * 3/2009 Gardner, Jr. ........ A01M 31/002 43/107
7,519,279 B2 * 4/2009 Zobele ................... H01R 35/04 392/390
7,530,195 B2 * 5/2009 Muller .................. A01M 23/38 43/99
7,541,936 B2 * 6/2009 Wijenberg ............. A01M 1/14 43/132.1
7,712,247 B2 * 5/2010 Wijenberg ............ A01M 1/026 43/121
7,748,161 B1 * 7/2010 Jordan, Jr. ............ A01M 1/245 43/132.1
7,757,430 B2 * 7/2010 Wetzel ................ A01M 31/002 43/99
8,088,999 B1 * 1/2012 Payou ...................... H02G 3/14 174/67
8,456,131 B2 * 6/2013 Bukow ................. H02J 7/0044 320/113
9,015,987 B2 * 4/2015 Moran ................... G01C 15/00 340/573.2
9,226,488 B2 * 1/2016 Schumacher ......... A01M 1/026
9,386,763 B2 * 7/2016 Vasudeva ............. A01M 1/023
9,387,501 B2 * 7/2016 Gale ................... A01M 7/0003
D765,037 S * 8/2016 Hebert ......................... D13/156
9,489,824 B2 * 11/2016 Osseiran ............. A01M 1/2011
D781,241 S * 3/2017 Knight ......................... D13/156
10,161,806 B2 * 12/2018 Lermann .................. G01K 1/12
10,448,627 B2 * 10/2019 Austin .................. A01M 1/026
10,524,461 B1 * 1/2020 Files ..................... G01S 13/888
10,574,005 B1 * 2/2020 Baldwin ................ H01R 27/02
10,966,420 B2 * 4/2021 Ching ..................... A01M 1/10
11,033,018 B2 * 6/2021 Laut ....................... H01H 35/14
11,063,396 B2 * 7/2021 Iaconis .................. H04N 7/183
11,234,427 B2 * 2/2022 Files ....................... G06F 9/542
11,277,587 B1 * 3/2022 Baldwin ................ H04N 23/57
11,404,831 B1 * 8/2022 Baldwin ............. H01R 13/717
11,523,604 B2 * 12/2022 Files ..................... A01M 23/38
11,617,362 B2 * 4/2023 Siler ..................... A01M 23/30 43/58
11,715,917 B1 * 8/2023 Baldwin ............. H01R 13/748 439/535
11,980,177 B2 * 5/2024 Dzisiewski-Smith ....................... G01R 27/2694
12,171,211 B2 * 12/2024 Spomer ................. A01M 1/026
2005/0233633 A1 * 10/2005 Chien ................ H01R 13/6691 439/502
2008/0148624 A1 * 6/2008 Borth ..................... G08B 21/18 43/132.1
2008/0236023 A1 * 10/2008 Thomas ................ A01M 23/32 43/58
2009/0013587 A1 * 1/2009 Wetzel .................. A01M 23/38 43/98
2009/0078444 A1 * 3/2009 Claffy ...................... H02G 3/14 174/66
2009/0090044 A1 * 4/2009 Foley ...................... A01M 1/20 43/131
2009/0172995 A1 * 7/2009 Wetzel .................. A01M 23/38 43/98
2010/0043275 A1 * 2/2010 Battick ................. A01M 29/12 43/131
2015/0216159 A1 * 8/2015 Vasudeva ............. A01M 1/103 43/123
2016/0336726 A1 * 11/2016 Melistas .................. H02G 3/14
2017/0338636 A1 * 11/2017 Chabra, Jr. .......... H01R 13/447
2019/0246623 A1 * 8/2019 Tews ................... A01M 31/002
2020/0005626 A1 * 1/2020 Triventi ................ A01M 1/026
2020/0029546 A1 * 1/2020 Aylward .............. B65D 83/262
2021/0056298 A1 * 2/2021 Vickery ................. G06V 20/52
2024/0235094 A1 * 7/2024 Satagaj .............. H01R 13/6683
2025/0038501 A1 * 1/2025 Jacobson ................ A01M 1/24

OTHER PUBLICATIONS

Original and Translation of GB2585288 (Year: 2021).*
Original and Translation of MY186002 (Year: 2021).*
Original and Translation of TW202202044 (Year: 2022).*
Original and Translation of WO2011098087 (Year: 2011).*
Original and Translation of WO2014019073 (Year: 2014).*

* cited by examiner

WALL PLATE WITH PEST ABATEMENT CIRCUITRY

BACKGROUND

Technical Field

The present disclosure generally relates to abatement of pests inside a building or other structure. More particularly, but not exclusively, the present disclosure relates to electronic circuitry integrated on an inside surface of a wall plate that covers an electrical box.

Description of the Related Art

FIG. 1A is a standard wall plate 10 positioned over a standard single-gang electrical box 12 that has secured therein a standard duplex electrical outlet 14. The wall plate 10 is secured by a single screw 16 through an aperture 18 (FIG. 1B) in the wall plate 10. These structures, which include the electrical box 12, electrical outlet 14, and wall plate 10, are commonly deployed in buildings and other structures for the convenience of people and for other reasons. More generically, electrical boxes of any size are desirably included in buildings and other structures, and various electrical conduits pass behind walls of the building in-to and out-from the electrical boxes. The electrical power available in such electrical boxes is useful for controlling lights, providing power to machines, and the like.

FIG. 1B is the standard single-gang electrical box 12 of FIG. 1A with the wall plate 10 removed. The standard duplex electrical outlet 14 includes a threaded receptacle 20. When the wall plate 10 is deployed, the single screw 16 (not shown in FIG. 1B) passes through the wall plate aperture 18 and rotatably cooperates with the threaded receptacle 20 to secure the wall plate to the electrical outlet 14. In this system, electrical connections of the electrical outlet 14, and in some cases other electrical conduits, are shielded from human touch. Hence, the risk of shocking humans or other animals is reduced when wall plates are used, and such wall plates are very common.

It is known that cockroaches, bedbugs, ticks, beetles (e.g., spider beetles, carpet beetles), palmetto bugs, booklice, bat bugs, and other pests can infest inside spaces, and such pests are sometimes found inside electrical boxes. Various theories suggest that electrical boxes provide heat, darkness, relative safety, electromagnetic energy, or other characteristics that attract such pests. It is further known that pests in electrical boxes leave behind waste, food, food residue, and other substances that tend to corrode or otherwise deteriorate insulation on electrical wire and other structures of the building's electrical subsystem. This deterioration can lead to electricity disruption, including fire, which is undesirable.

All of the subject matter discussed in the Background section is not necessarily prior art and should not be assumed to be prior art merely as a result of its discussion in the Background section. Along these lines, any recognition of problems in the prior art discussed in the Background section or associated with such subject matter should not be treated as prior art unless expressly stated to be prior art. Instead, the discussion of any subject matter in the Background section should be treated as part of the inventor's approach to the particular problem, which, in and of itself, may also be inventive.

BRIEF SUMMARY

The following is a summary of the present disclosure to provide an introductory understanding of some features and context. This summary is not intended to identify key or critical elements of the present disclosure or to delineate the scope of the disclosure. This summary presents certain concepts of the present disclosure in a simplified form as a prelude to the more detailed description that is later presented.

The device, method, and system embodiments described in this disclosure (i.e., the teachings of this disclosure) enable the detection of pests such as cockroaches in areas where standard electrical fixtures are present. In some cases, the detection of such pests may be used to help abate the presence of the pests.

Within the devices, systems, and methods discussed in the present disclosure, optional complex computing operations are performed efficiently, with reduced or no power costs, and in some cases proximate to where the results of such operations are verified. The innovation described in the present disclosure is new and useful, and the innovation is not well-known, routine, or conventional in the pest abatement industry.

The optional complex computing innovation described herein, when deployed, may include known building blocks combined in new and useful ways along with other structures and limitations to create something more than has heretofore been conventionally known. The embodiments improve on computing systems which, when un-programmed or differently programmed, cannot perform or provide the specific pest abatement complex computing operations claimed herein.

The embodiments described in the present disclosure improve upon known pest abatement processes and techniques.

The computerized acts described in the embodiments herein are not purely conventional and are not well understood. Instead, the acts are new to the industry. Furthermore, the combination of acts as described in conjunction with the present embodiments provides new information, motivation, and business results that are not already present when the acts are considered separately.

There is no prevailing, accepted definition for what constitutes an abstract idea. To the extent the concepts discussed in the present disclosure may be considered abstract, the claims present tangible, practical, and concrete applications of said allegedly abstract concepts.

The embodiments described herein optionally use computerized technology to improve the technology of pest abatement operations, but other techniques and tools remain available to perform pest abatement operations. Therefore, the claimed subject matter does not foreclose the whole or even substantial pest abatement technological area.

These features with other objects and advantages that will become subsequently apparent reside in the details of construction and operation as more fully described hereafter and claimed, reference being had to the accompanying drawings forming a part hereof.

This Brief Summary has been provided to describe certain concepts in a simplified form that are further described in more detail in the Detailed Description. The Brief Summary does not limit the scope of the claimed subject matter, but rather the words of the claims themselves determine the scope of the claimed subject matter.

BRIEF DESCRIPTION OF THE SEVERAL VIEWS OF THE DRAWINGS

Non-limiting and non-exhaustive embodiments are described with reference to the following drawings, wherein like labels refer to like parts throughout the various views unless otherwise specified. The sizes and relative positions of elements in the drawings are not necessarily drawn to scale. For example, the shapes of various elements are selected, enlarged, and positioned to improve drawing legibility. The particular shapes of the elements as drawn have been selected for ease of recognition in the drawings. One or more embodiments are described hereinafter with reference to the accompanying drawings in which:

In the present disclosure, for brevity, certain sets of related figures may be referred to as a single, multi-part figure to facilitate a clearer understanding of the illustrated subject matter. For example, FIGS. 1A-1B may be individually or collectively referred to as FIG. 1. FIGS. 4A-4B may be individually or collectively referred to as FIG. 4. Structures earlier identified may not be repeated for brevity.

DETAILED DESCRIPTION

Figure 1B:
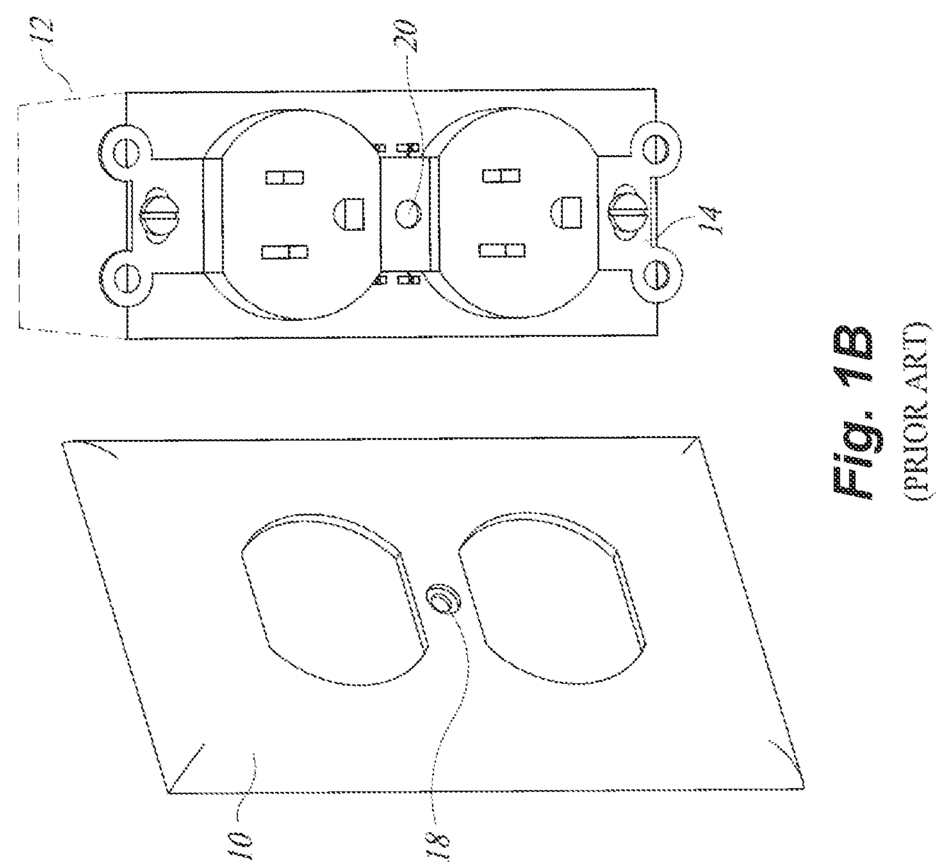
FIG. 1B is the standard single-gang electrical box of FIG. 1A with the wall plate removed.

The present disclosure may be understood more readily by reference to this detailed description and the accompanying figures. The terminology used herein is for the purpose of describing specific embodiments only and is not limiting to the claims unless a court or accepted body of competent jurisdiction determines that such terminology is limiting. Unless specifically defined in the present disclosure, the terminology used herein is to be given its traditional meaning as known in the relevant art.

In the following description, certain specific details are set forth in order to provide a thorough understanding of various disclosed embodiments. However, one skilled in the relevant art will recognize that embodiments may be practiced without one or more of these specific details, or with other methods, components, materials, and the like. In other instances, certain structures associated with electrical components such as electrical boxes, electrical conduit, switches, outlets, jacks, ports, and the like have not been shown or described in detail to avoid unnecessarily obscuring more detailed descriptions of the embodiments. Along these lines, those skilled in the relevant art will also recognize that in some cases, well-known structures associated with computing systems, including client and server computing systems as well as networks, have not been shown or described in detail to avoid unnecessarily obscuring more detailed descriptions of the embodiments.

The device, method, and system embodiments described in this disclosure (i.e., the teachings of this disclosure) include wall plate structures that enable the detection and in some cases the abatement of undesirable pests (e.g., insects) inside the building or other area proximate the wall plate structure.

An embodiment of the present invention includes a pest abatement wall plate having a wall plate portion structured to cover an electrical box. The electrical box is, for example, integrated or otherwise mounted in a wall of a room. The wall plate portion is formed substantially from a plastic material, but other materials are of course contemplated. The pest abatement wall plate has an inner surface and an outer surface; the inner surface being adjacent to an inside volume of the electric box when the pest abatement wall plate is deployed, and the outer surface being exposed into the room where the electric box is located. In this embodiment, a hosting platform arranged to host pest abatement circuitry, pesticide, or pest abatement circuitry and pesticide, is proximate the inner surface of the pest abatement wall plate. That is, the hosting platform is nearby, close to, adjacent, joined with, integrated within, affixed thereto, formed thereon, or realized in some other way in the space behind the wall plate portion. In some cases, a hosting platform is formed or otherwise realized on an inside surface of a wall plate portion, and in other cases, the hosting platform is formed or otherwise realized on a support structure or other portion of a pest abatement wall plate system.

Turning to the remainder of this Detailed Description, the present invention may be understood more readily by reference to this detailed description of the invention. The terminology used herein is for the purpose of describing specific embodiments only and is not limiting to the claims unless a court or accepted body of competent jurisdiction determines that such terminology is limiting. Unless specifically defined herein, the terminology used herein is to be given its traditional meaning as known in the relevant art.

Prior to setting forth the embodiments however, it may be helpful to an understanding thereof to first set forth definitions of certain terms that are used hereinafter.

The terms "abate" and "abatement" are used, in all their grammatical forms, throughout the present specification and claims to refer to any reduction, lessening, subsidence, dwindling, declination, diminution, attenuation, and the like, up to and including a total eradication. In at least some cases, the terms "abate" and "eradicate," including all their grammatical forms, are used interchangeably.

A "pest" refers to an undesirable living entity that is often, but not always, an insect. A non-limiting, non-exhaustive list of pests targeted in the present specification and claims includes cockroaches, bedbugs, ticks, beetles (e.g., spider beetles, carpet beetles), palmetto bugs, booklice, bat bugs, and other pests that can infest inside spaces. Pests are not limited to insects, and other pests (e.g., spores, bacteria, germs, and the like) are of course contemplated.

A "hosting platform" is a physical structure or portion of a physical structure that is arranged to stage pest abatement circuitry and, optionally, a pesticide. A non-limiting, non-exhaustive list of hosting platform types includes those arranged as a distinct planar surface, a pocket, a bowl, a compartment, an aperture, a protrusion, a protuberance, or some other hosting platform means suitable to stage pest abatement circuitry and, optionally, a pesticide. In some cases, a hosting platform includes a particular portion of a structure that is specifically designated for staging pest abatement circuitry or, optionally, a pesticide. Such designation may be by marking (e.g., ink, paint, cathodic reaction, burning, or the like) or by physical identification (e.g., embossment, etching, trenching, carving, scratching, or the like) or by some other clear indicator.

A "pesticide" is a means for eradicating or at least reducing the undesirable effects of a pest; and "eradicating" (or to "eradicate") means to kill, eliminate, annihilate, repel, get rid of, remove, do away with, reduce the population of, root out, uproot, suppress, destroy, exterminate, extinguish, weed out, stamp out, wipe out, crack down on, abolish, erase, obliterate, efface, expunge, extirpate, or the like. Eradicating a pest includes, but is not limited to, causing the death of the pest, reducing the number of pests, reducing the proliferation of pests, reducing the multiplying of pests, and the like. That is, eradicating a pest also includes disrupting the normal course of behavior of the pest, which includes, but is not limited to, encouraging the pest to relocate or otherwise vacate the area in, and proximate to, the area where the pesticide is located. As the term is used in the present specification and claims, a pesticide may be, or otherwise take the form of, a liquid, a solid, a powder, a spray, an aerosol, an adhesive, a gel, a paste, a solution, a particulate, pellets, granules, an impregnated material, or any other known form. As the term is used in the present specification and claims, a pesticide may be or otherwise include an attractant, a bait, a food source, a poison, an irritant, an annoyance, and the like. In some cases, a pesticide will eradicate a pest directly; in other cases, the pesticide may also be or include an ovicide, a larvicide, or a substance that targets some other area of a pests' life cycle. Such pesticide may be or include a single substance or a combination of substances. A non-limiting, non-exhaustive list of pesticides include Geraniol, Fipronil, Abamectin, an Organochloride (e.g., DDT, Aldrin, Dieldrin, Endrin, Heptachlor, or some other chlorinated hydrocarbon), an Organophosphate (e.g., Bensulide, Chlorpyrifos, Diazinon, Dimethoate, Phosalone, Phosmet, Trichlorfon, or the like), a Carbamate (e.g., Aldicarb, Bendiocarb, Carbaryl, Methomyl, or the like), a Pyrethroid (e.g., Chrysanthemum, Tanacetum, Tetramethrin, or the like), pyrethrin, a Neonicotinoid (e.g., nicotine, Imidacloprid, Acetamiprid, Thiaclopridor or the like), a Butenolide (e.g., flupyradifurone), a Ryanoid/diamide (e.g., ryanodine, Rynaxypyr, chlorantraniliprole, or the like), fipronil, hydramethylnon, indoxacarb, mineral oil, caffeine, citronellol, ivermectin, avermectin, menthol, oregano, butyl lactate, isopropyl myristate, triethyl citrate, isopropyl aclcohol, a borate such as boric acid, diatomaceous earth, and a biological (e.g., *bacillus* sphaericus, granulovirus, and the like).

Figure 2:
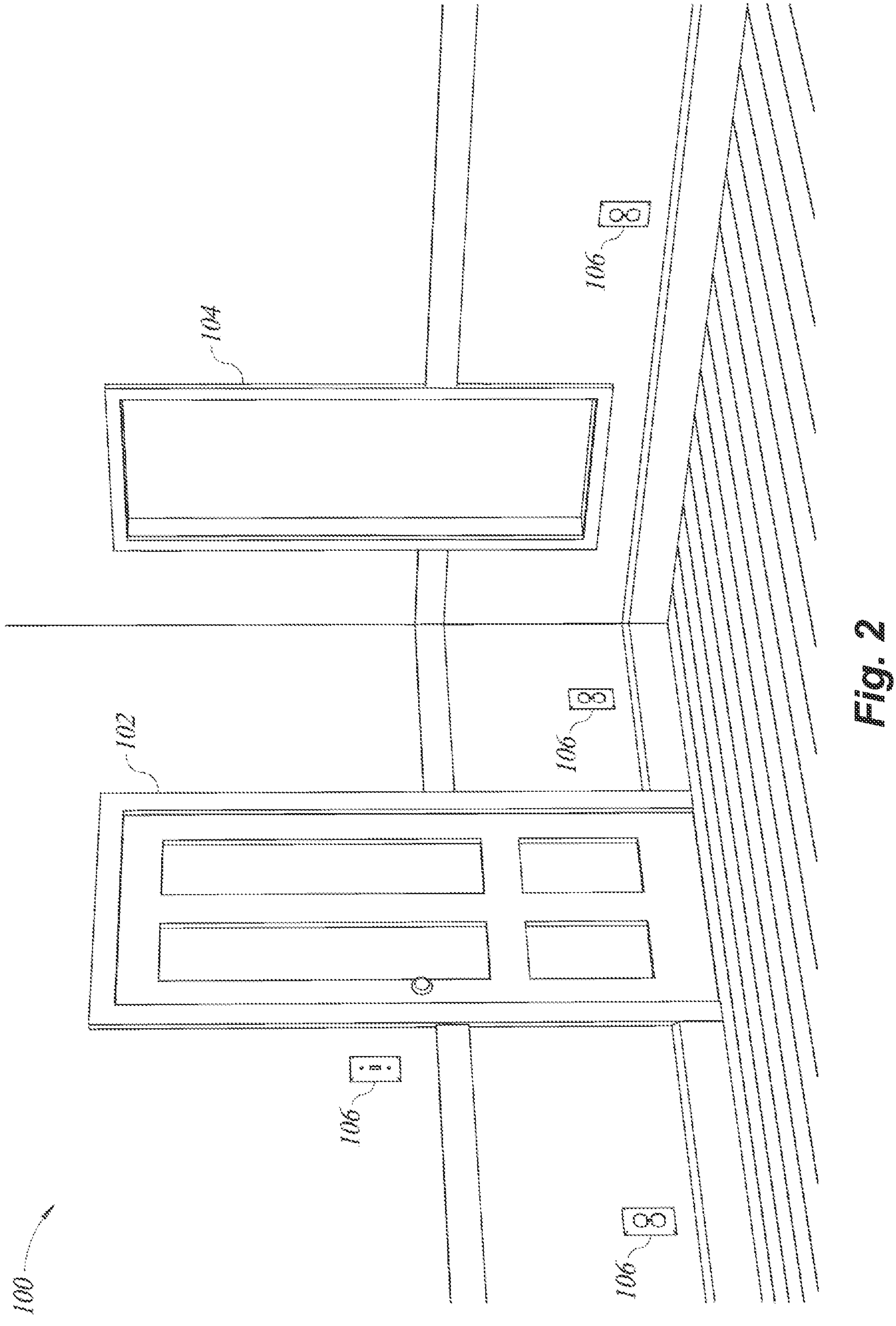
FIG. 2 is a room in a building as viewed from inside of the room.

FIG. 2 is a room 100 in a building as viewed from inside of the room 100 looking toward a corner of the room 100. A door 102 is constructed through a first wall of the room 100, and a window 104 is constructed through a second wall of the room 100. Sometimes, pests move through one or more parts of the building. Pests can ingress or egress the room 100 via electrical fixtures (e.g., switches, outlets, cable ports, and the like) that are constructed in walls of the room 100. To the pests, and in some cases abate the pests, various wall plates with pest abatement circuitry 106 are installed over at least some of the electrical fixtures in the room. In FIG. 2, four wall plates with pest abatement circuitry 106 are identified. In other embodiments, any suitable number of wall plates with pest abatement circuitry 106 may be deployed.

Figure 3:
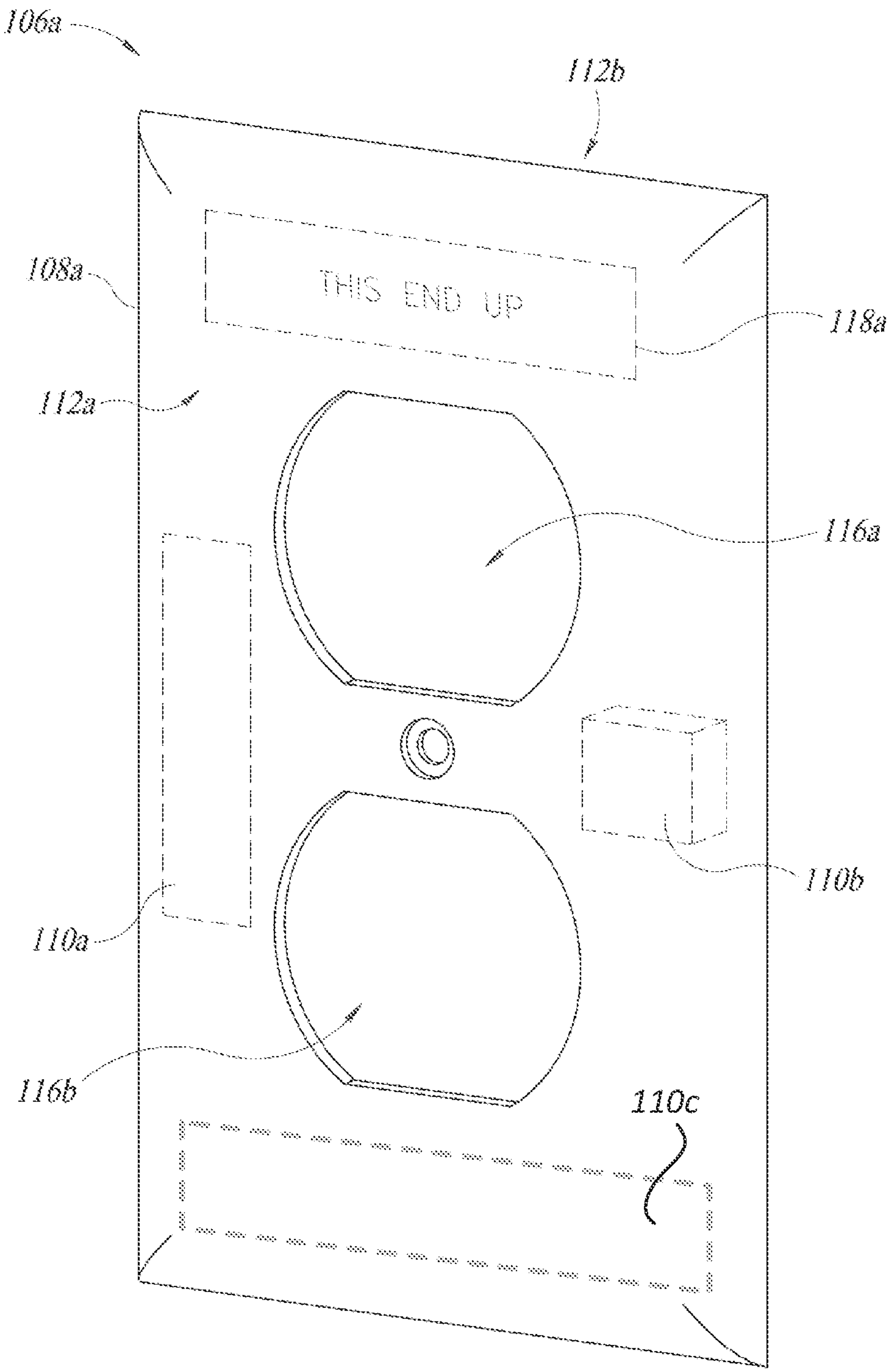
FIG. 3 is a first embodiment of a wall plate with pest abatement circuitry.

FIG. 3 is a first embodiment of a wall plate with pest abatement circuitry 106*a*. The wall plate with pest abatement circuitry 106*a* includes a wall plate portion 108*a* and at least one hosting platform 110*a*, 110*b*, 110*c*. Each of the hosting platforms 110*a*, 110*b*, 110*c* may be arranged to host pest abatement circuitry, a pesticide, or pest abatement circuitry and a pesticide. Other wall plates with pest abatement circuitry embodiments may have one hosting platform, three pesticide hosting platforms, or some other number of hosting platforms. In the present disclosure, a hosting platform 110 may be formed as a single structure or as a plurality of structures. For brevity, a plurality of hosting platforms formed on a wall plate with pest abatement circuitry 106 may still be referred to as a hosting platform 110.

The wall plate portion 108*a* of FIG. 3 has an inside surface 112*a* and an outside surface 112*b*. Generally speaking, any particular wall plate portion 108 has an inside surface and an outside surface. The wall plate portion 108*a* in FIG. 3 is arranged to cover a standard electrical duplex outlet in a single-gang electrical box, and when deployed, the inside surface 112*a* is adjacent the inside volume of the single-gang electrical box, and the outside surface 112*b* is facing the room 100 (FIG. 2) in which the pest abatement wall plate 106*a* is deployed. In other cases, the wall plate portion 108 may be arranged to cover an electrical fixture of any particular size, shape, and configuration.

The wall plate portion 108*a* of the first embodiment of a wall plate with pest abatement circuitry 106*a* includes a wall plate securing structure 114. The wall plate securing structure 114 may be arranged as, or including, an aperture, a magnet, a stud, a hook-and-loop structure, an adhesive, or any other securing means. Generally, the securing structure 114 secures, or helps to secure, the wall plate portion 108*a* of the wall plate with pest abatement circuitry 106*a* in place, over the standard electrical component (e.g., the duplex outlet of FIG. 3), and covering the otherwise exposed areas of the electrical box (e.g., the single-gang electrical box of FIG. 3).

When the wall plate with pest abatement circuitry 106*a* is deployed, the duplex outlet receptacles are exposed in the room 100 (FIG. 2) via first and second apertures for the electrical fixture 116*a*, 116*b*, and the pesticide hosting platforms 110*a*, 110*b*, 110*c* are adjacent the inside volume of the single-gang electrical box where they cannot easily or freely be accessed by people, pets, or other living things inside the room 100 (FIG. 2).

Figure 1A:
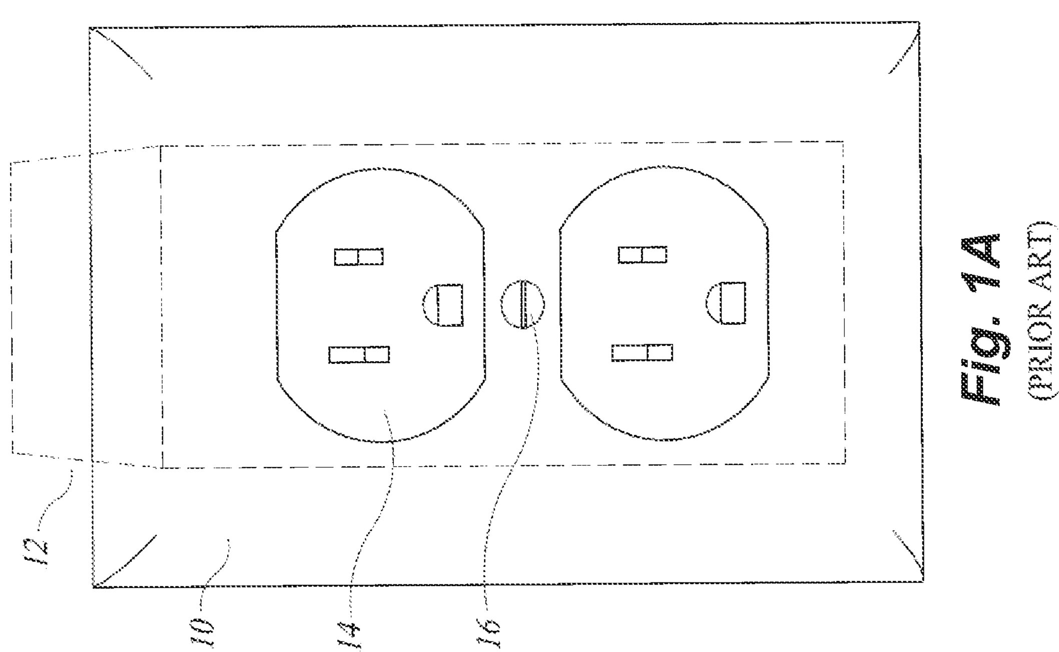
FIG. 1A is a standard wall plate positioned over a standard single-gang electrical box that has secured therein a standard duplex electrical outlet.

In cases where the wall plate securing structure 114 is an aperture, the act of securing the wall plate with pest abatement circuitry 106*a* is performed along the lines of a known standard wall plate 10A (FIG. 1). That is, a screw or some other screw-like structure is passed through the wall plate securing structure 114 (i.e., an aperture in this embodiment) and rotated or otherwise advanced into the standard electrical duplex outlet (not shown). When secured, the hosting platforms 110*a*, 110*b*, 110*c* are adjacent the inside volume of the electrical box, and the duplex outlet receptacles are exposed in the room 100 (FIG. 2) via first and second apertures for the electrical fixture 116*a*, 116*b*. When it is time to service the wall plate with pest abatement circuitry 106*a* (e.g., to reapply pesticide, for example), the screw or screw-like structure is reversed out from the standard electrical duplex outlet, the wall plate with pest abatement circuitry 106*a* is removed. In at least some cases, a battery of the pest abatement circuitry may be changed, a pesticide may be re-applied to one or more hosting platforms 110*a*, 110*b*, 110*c*, or some other service may be performed.

In other cases, for example when the wall plate securing structure 114 is arranged as a magnet, the act of securing the wall plate with pest abatement circuitry 106*a* is performed by aligning the duplex outlet receptacles through the first and second apertures for the electrical fixture 116*a*, 116*b*, and advancing the wall plate with pest abatement circuitry 106*a* toward the standard electrical duplex outlet (not shown). Optionally, an orientation means 118*a* may be included, for example, to help align the wall plate with pest abatement circuitry 106*a*. Such orientation means 118*a* may help avoid "spilling" pesticide powder or liquid. The wall plate securing structure 114 (i.e., a magnet in this embodiment) will engage with, and adhere to, a screw head, stud, or other ferrous object positioned on or in a central portion of the standard electrical duplex outlet. When conditional servicing of the wall plate with pest abatement circuitry 106*a* is desired (e.g., for a reapplication of pesticide, for example), the wall plate with pest abatement circuitry 106*a* can simply be "pulled" back from its previous position about the standard electrical duplex outlet. In this way, servicing an electrical-box-facing-portion of the wall plate with pest abatement circuitry 106*a* is very fast and easy.

Figure 4A:
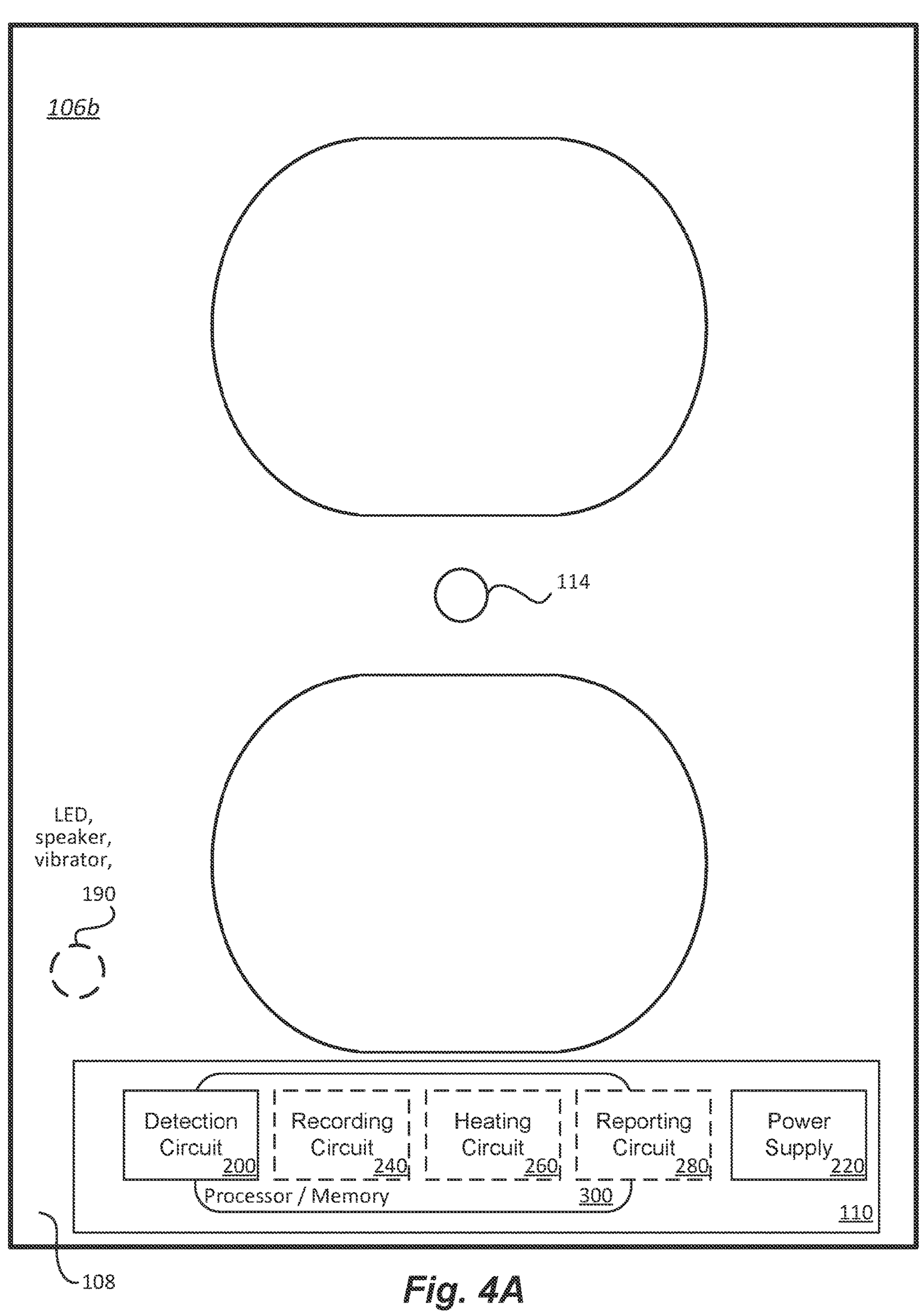
FIGS. 4A and 4B are embodiments of wall plates with pest abatement circuitry.
Figure 4B:
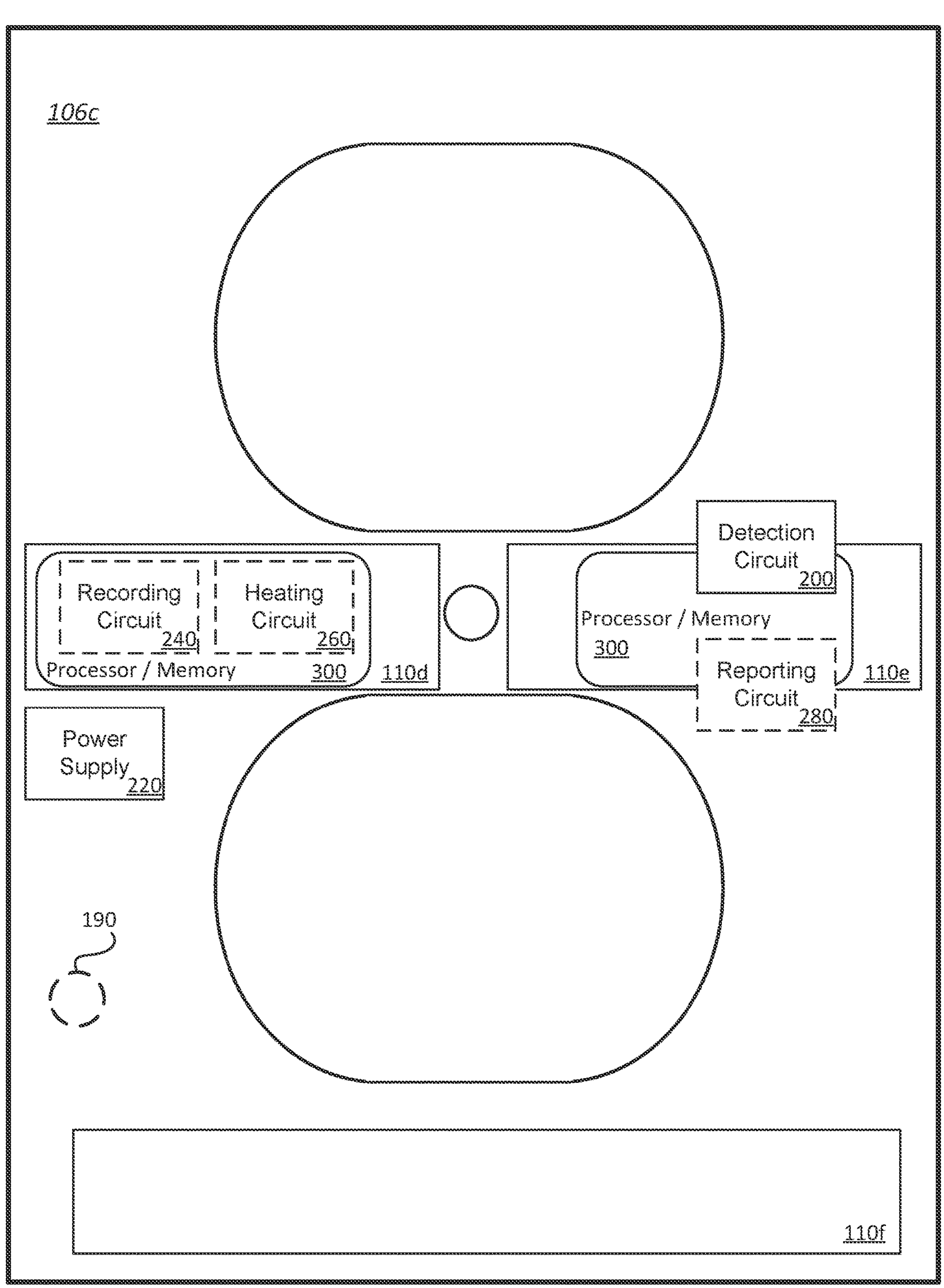

FIGS. 4A and 4B are other embodiments of a wall plate with pest abatement circuitry 106*b*, 106*c*, respectively. For brevity, FIGS. 4A-4B may be individually or collectively referred to as FIG. 4, and a wall plate with pest abatement circuitry 106 may refer to any one or more of the wall plates of the present disclosure; that is, those wall plates having a hosting platform for one or both of pest abatement circuitry and pesticide (e.g., wall plates with pest abatement circuitry 106*a*, 106*b*, 106*c*, and the like).

The embodiments of FIG. 4 include a wall plate portion 108 and one or more hosting platforms 110 (e.g., hosting platforms 110, 110*a*, 110*b*, 110*c*, 110*d*, 110*e*, 110*f*, and the like). The wall plate portion 108 is structured to cover a single-gang electrical box, but other sizes and shapes of wall plate portion 108 are contemplated to cover other electrical boxes, fixtures, components, devices, and the like.

The hosting platform 110 is proximate the inner surface of the wall plate portion 108. The hosting platform 110 is arranged to stage the pest abatement circuitry, which includes a detection circuit 200, a power supply 220, and optionally, a pest abatement circuitry interface 190, a recording circuit 240, a heating circuit 260, and a reporting circuit 280. In at least some cases, the hosting platform 110 is further arranged to stage a processor 300. Other optional circuits are of course contemplated. The hosting platform 110, or a portion of the hosting platform 110 (e.g., hosting platforms 110*a*, 110*b*, 110*c*, 110*d*, 110*e*, 110*f*, and the like), may in some cases additionally or alternatively host an insecticide. As evident in FIG. 4, the wall plate portion 108 may have any suitable number of hosting platforms 110. In at least one embodiment, a wall plate portion includes one or more hosting platforms 110*d*, 110*e*, 110*f* where electronic circuitry is placed and concurrently one or more hosting platforms 110*d*, 110*e*, 110*f* where a pesticide is placed. In such cases, the electronic circuitry, the pesticide, or the electronic circuitry and the pesticide may be accessible without removing the wall plate portion 108 from the wall via a door, a movable panel, a cover, or via some other access structure.

In at least some cases, the wall plate portion 108 and any integrated, adjoining, or otherwise related parts of the wall plate, are formed substantially from a plastic material. In other cases, the wall plate portion 108 and other parts may be formed of a wood, metal, composite material, or any other suitable substance. In still other cases, the wall plate portion 108 and other parts are formed of a combination of materials.

The wall plate portion 108 has an inner surface and an outer surface. The inner surface is adjacent to an inside volume of the electrical box when the wall plate with pest abatement circuitry is deployed. Correspondingly, the outer surface is adjacent the room or other environment where the wall plate with pest abatement circuitry is deployed. The wall plate portion 108 will include a wall plate securing structure 114 along the lines of other wall plate securing structures 18, 114 described in the present disclosure.

Figure 5:
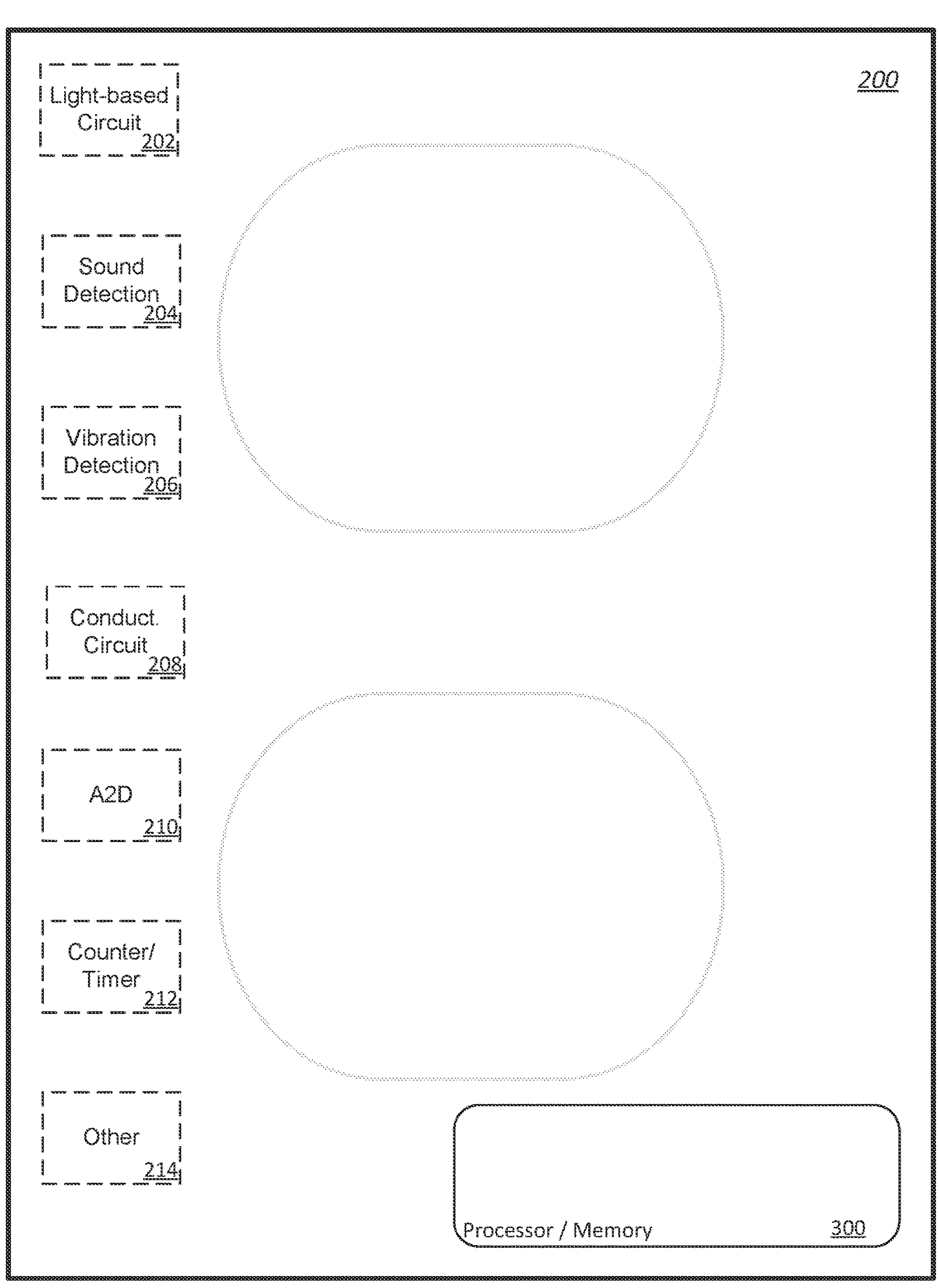
FIG. 5 is an embodiment of a detection circuit.

FIG. 5 is an embodiment of a detection circuit 200 that forms part of the pest abatement circuitry of the present disclosure. The detection circuit 200 is arranged to detect the presence of one or more pests proximate the wall plate. The pests may be on the inner surface of the wall plate, in the electrical box, within the walls of a structure, or some other area proximate the pest abatement circuitry. The detection circuit may be based on motion of a pest, sound of the pest, vibration of the pest, electrical characteristics (e.g., resistance, capacitance, impedance, or the like) of the pest, or some other detection means.

When pests are detected proximate the detection circuit 200, the pests may be within about an inch (1 in.) of the detection circuit 200, within about six inches (6 in.) of the detection circuit 200, within about twelve inches (12 in.) of the detection circuit 200, or within some other distance of the detection circuit 200. In many cases, the distance from the detection circuits 200 where a pest may be detected is often related to the type of detection circuitry deployed. For example, a light-based circuit may only be able to detect pests present in an electrical box within an inch or two, but a vibration-based circuit may be able to detect pests several feet from the detection circuit 200. In at least one case, detecting pests may include analyzing accumulated sensor input with artificial intelligence or other complex computing logic.

Optionally, the detection circuit 200 may include any one or more of a light-based circuit 202, a sound detection circuit 204, a vibration detection circuit 206, and a conductance-based circuit 208. In at least some cases, the sound detection circuit may also include an analog-to-digital (A2D) converter circuit 210, a counter/timer circuit 212, and other optional circuits 214. In at least some cases, the logic of the detection circuit 200 will pass signals to, from, or to and from the pest abatement circuitry interface 190.

A light-based circuit 202 may include any one or more of an infrared sensor, a laser, a light-emitting diode, a camera, or the like. The light-based sensor may include circuitry that detects pests by emitting a light signal and detecting a returned echo of the light signal, a loss or diminishment of the light signal, a changing light signal (e.g., light reflections changing because of pests in motion), or some other manifestation of emitted light, received light, or emitted and received light. When the light-based circuit 202 includes a camera, detection of pests may include capturing any suitable number of images proximate the inner surface 110 of the wall plate portion 108 and comparing images captured at a first time against images captured at a later second time. In at least some cases, a light-based circuit 202 includes an image sensor, but rather than forming one or more images, raw data from an image sensor circuit is analyzed. Other configurations of light-based circuitry are of course contemplated.

A sound detection circuit 204 may include any suitable microphone, microphone-based, or other "listening" circuitry. The microphone logic may include a conventional membrane-based microphone, a micro-electro-mechanical (MEMs)-based microphone, or some other type of microphone logic. Conceptually, the sound detection circuit 204 is arranged to detect pest activity based on detected audio signals. The audio signals produced by the pests may be inside the human-audible range or outside the human-audible range. In some cases, the sound detection circuit 204 includes an audio source (e.g., a piezo, a vibrator, a speaker, or some other audio source). The presence of one or more pests may be based on echoed signals of the audio produced by the audio source.

A vibration detection circuit 206 in some cases is similar to the sound detection circuit 204. That is, a vibration detection circuit 206 may use a membrane, a MEMs circuit, a crystal-based circuit, or any other such logic to detect vibration caused by pest activity. The vibration may be based on the motion of a pest's wings, legs, or other such parts of anatomy.

A conductance-based circuit 208 may be employed to detect a change in electrical properties of a circuit based on physical contact with a pest. Such physical contact may be caused when a pest contacts any suitable number of electrical contacts of the conductance-based circuit 208. In at least one case, the conductance-based circuit 208 includes at least one MEMs structure which, when deployed, applies an electrical current or other charge to the structure and detects a change (e.g., resistance, capacitance, inductance, impedance, or the like) in electrical properties of the structure when a pest comes in physical contact with the structure.

The detection circuitry may include A2D circuits 210, counter/timer circuits 212, and other circuits 214. The A2D circuits may for example, include sigma delta modulation circuits to quantify an accumulation of charge, an accumulation of photons, an accumulation of vibration, an accumulation of sound, or an accumulation of some other quantity over time. The digital output from the A2D circuits may provide a digital representation of one or more activities of a pest, and when such digital representation crosses determined threshold, a determination of pest activity may be generated.

In some cases, counters, timers, or other such counter/timer circuitry 212 is used to detect the presence of pest activity. Sometimes, for example, timers are used to trigger the sending of signals, the listening for echoes, and the like. IN other cases, counters are used to accumulate one or more types of detection events. To help eliminate false positives, for example, the determination of a suspected pest presence may be based on crossing a threshold of a certain number (e.g., 3, 10, 100, or some other threshold) of detection events. In such cases, anomalous non-pest events can be filtered out. Timers and counters may of course be used for many other purposes in the pest abatement circuitry.

Certain embodiments of the detection circuit 200 include or otherwise cooperate with a processor 300. The processor may include on-board memory, or the processor may have access to other memory. The processor 300, when included, is arranged to control certain operations of the detection circuit 200. In at least some cases, a processor circuit is arranged to control operations of the detection circuit or other parts of the pest abatement circuitry. Cooperative with the processor 300, a memory circuit may be included in the pest abatement circuitry. The memory circuit can include software instructions, which, when executed by the processor circuit, carry out operations of the wall plate with pest abatement circuitry.

The processor 300 and its associated logic (e.g., memory, software, input/output circuits, interrupt circuits, and the like) may be arranged to perform complex computing operations. Such complex computing operations may include machine learning algorithms, artificial intelligence algorithms, machine vision algorithms, and the like. In at least one case, detecting pests may include analyzing accumulated sensor input with artificial intelligence or other complex computing logic. For example, sensor input from the detection circuitry 200 (e.g., light signal data, sound signal data, vibration data, and the like) may be accumulated, filtered, extrapolated, normalized, or analyzed in any suitable way. Such analysis may be used to create a "signature" or other datum that can be compared to known signature data, and such comparisons or other analysis may lead to a detection decision (e.g., yes, no, percent likely, or the like) such as a confidence level that pests have or have not been detected.

Figure 6:
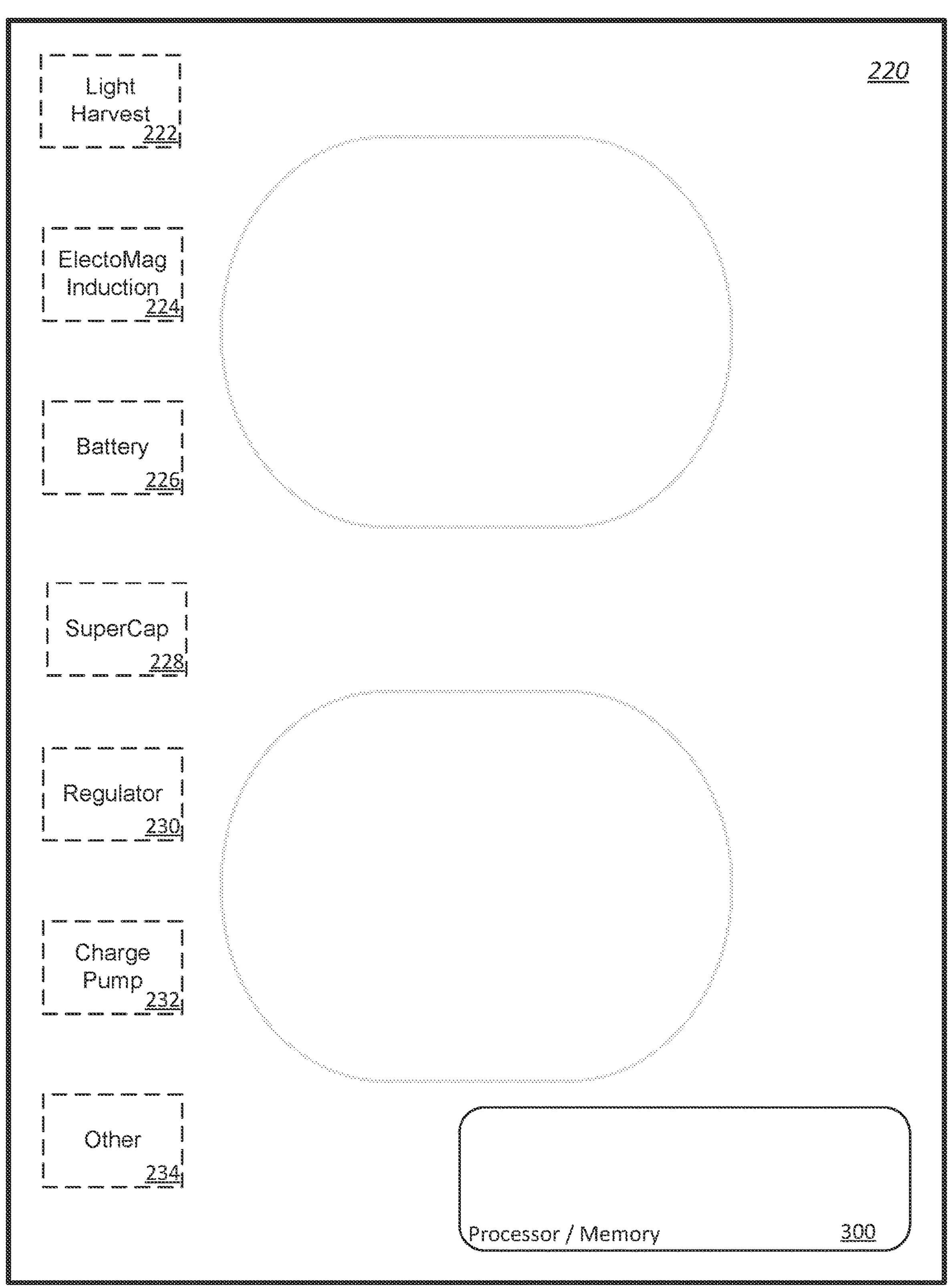
FIG. 6 is an embodiment of a power supply circuit.

FIG. 6 is an embodiment of a power supply circuit 220 that forms part of the pest abatement circuitry of the present disclosure. The power supply circuit 220 may include light harvesting circuitry 222, an electromagnetic induction circuit 224, a battery 226, a super capacitor 228, regulation circuitry 230, a charge pump 232, or any other suitable circuitry 234 (e.g., circuitry for passively generating power based on wind, vibration, sound, electromagnetic waves, or some other phenomenon). The power supply circuitry 220 may have any suitable complexity. In one case, for example, the other circuitry 234 of the power supply circuit 220 is simply wire or some other conductor that draws power from an electrical outlet mounted in an electrical box. In another case, the pest abatement circuitry interface 190 includes an aperture, a light pipe, or some other structure that includes or otherwise allows light to reach the light harvesting circuitry 222 such as a photocell that converts light to electrical power.

In some cases, the electromagnetic induction circuitry 224 includes one or more resonant circuits (e.g., conductive coils, electromagnets, or the like) arranged to harvest power from other circuits proximate the pest abatement circuitry. Such circuits may for example, include any suitable number of conductor coils which, in the presence of active or passive electrical energy, induce an electrical current used to power the pest detection circuitry 200.

One or more energy storage devices of any suitable configuration (e.g., battery 26, super capacitor 228, or the like) may be deployed as part of the power supply circuit 220. The energy storage devices may be rechargeable or disposable. The energy storage devices are typically arranged to provide power to the processor 300 and other circuitry of the power supply circuit 220. The energy storage devices may be recharged by the light harvesting circuits 222, the electromagnetic induction circuits 224, or in any other desirable manner.

The regulation circuitry 230, the charge pump circuitry 232, and some or all of the other circuitry 234 of the power supply circuit 220 may be used to provide stable power for the processor 300 or other circuits. The stable power may have any particular characteristics (e.g., voltage, current, phase, frequency, or the like).

Figure 7:
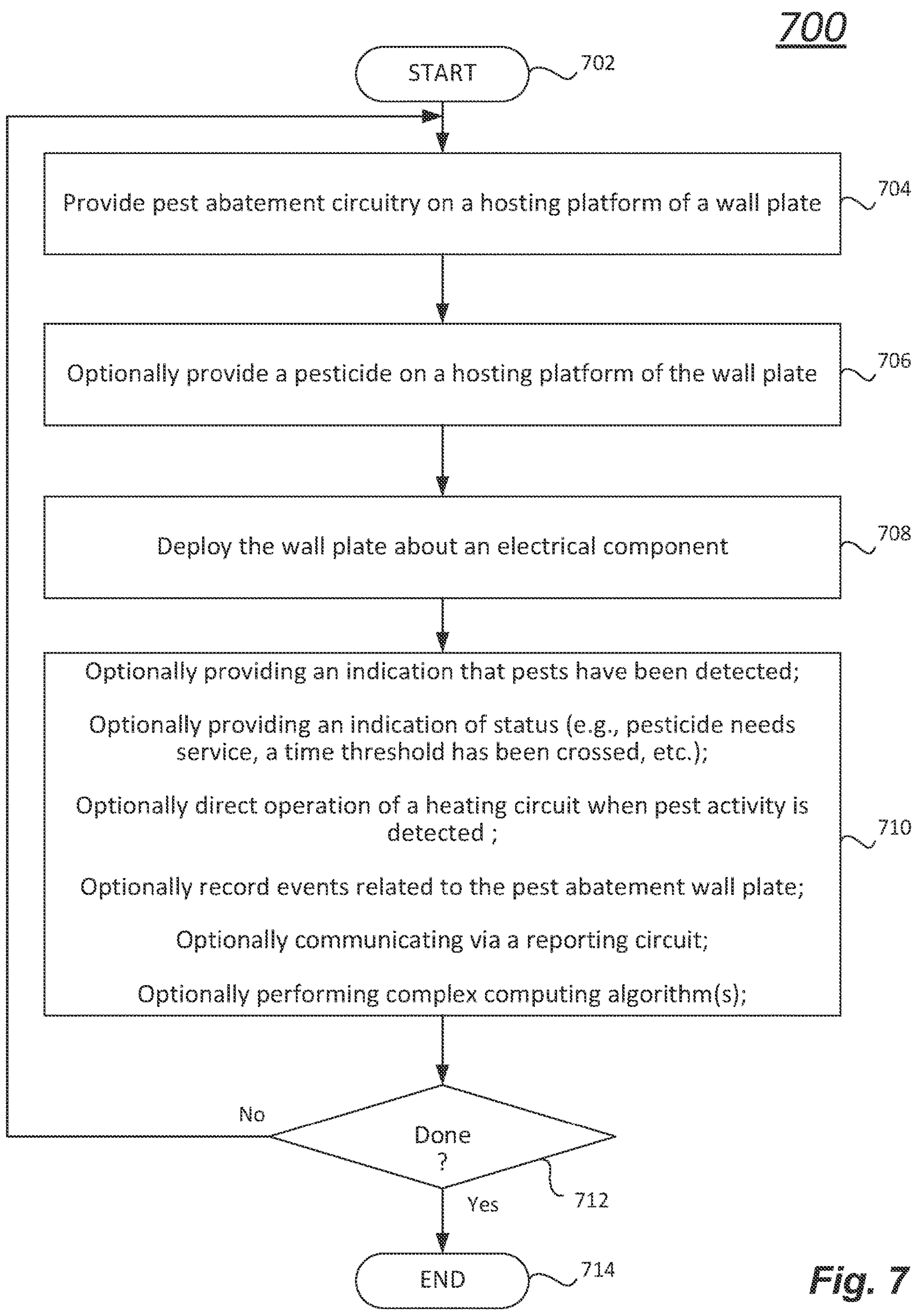
FIG. 7 is a data flow diagram of a pest abatement circuitry method.

FIG. 7 is a data flow diagram of a pest abatement circuitry method 700. One of skill in the art will recognize that the acts of FIG. 7 maybe performed entirely in a processor 300, partially in a processor 300 and partially in a remote computing server (not shown) such as a "cloud" computing device, partially in a remote computing device (not shown) such as a tablet computer, smartphone, or other mobile computing device, or in some other computing platform in any suitable manner. For brevity, some acts as readily known by one of skill in the art are not recited in the description of FIG. 7. Processing begins at 702.

At 704, pest abatement circuitry is provided. The pest abatement circuitry includes any one or more of a detection circuit 200, a power supply 220, a pest abatement circuitry interface 190, a recording circuit 240, a heating circuit 260, and a reporting circuit 280. In at least some cases, the pest abatement circuitry may also include a processor 300. Processing advances to 706.

At 706, a pesticide is optionally provided. The pesticide may be provided on a same hosting platform 110 as the pest abatement circuitry or a different hosting platform 110. In some cases, a portion of the pest abatement circuitry such as a heating circuit 260 and the pesticide are provided in close proximity to each other (e.g., on a same hosting platform 110, on adjacent hosting platforms 110, or the like). Processing advances to 708.

At 708, the wall plate is deployed about an electrical component. In some cases, the wall plate is along the lines of the duplex wall plates of FIGS. 3 to 6 of the present disclosure. In other cases, the wall plate is arranged to cover some other type of electrical component such as a 4-gang electrical box, a 6-gang electrical box, an 8-gang electrical box, a coaxial cable box, a junction box, a lighting fixture receptable, or the like. One of skill in the art will recognize that the teaching of the present disclosure may be suitably used in cooperation with one or more electrical components or devices of any type, size, configuration, function, and the like. Processing advances to 710.

Optional processing at 710 may include detecting motion of a pest via the detection circuit 200 and providing an indication of the detection via any suitable means. In some cases, for example, the indication may include directing illumination of a light source such as a light emitting diode (LED) arranged as the pest abatement circuitry interface 190, directing output of an audio signal such as a speaker, a piezo, or some other audio source arranged as the pest abatement circuitry interface 190, or performing some other output. In cases where an LED is deployed, the LED may be any one or more colors, the LED may be flashed, the LED output may be encoded, or the LED may be used in any other suitable manner.

Other operational processing may also be performed that includes providing an indication of status. For example, one status may be an indication that a bait platform is "empty," "consumed," or otherwise in need of service; one status may be an indication that a heating circuit 260 has been enabled; one status may be that information has been wirelessly communicated; one status may be that wireless communication is enabled or otherwise functioning; and one status may be that a power supply is in need or change or some other service. Many other status indications are of course also contemplated.

Optional processing may include optionally directing heating of a pesticide with a heating circuit 260. The heating circuit may be enabled, disabled, increased, decreased, or operating in any other way based on detection of a pest with a detection circuit 200.

Optional processing may include optionally recording events in a memory of a processor circuit 300. The events may include one or more pest detections, one or more heating events, pesticide service events, location of the wall plate events, or any other events.

Optional processing may include optionally communicating via a reporting circuit 280. Any suitable number and type of events may be recorded, and this information and other information may be communicated from the wall plate. The communication may be between a wall plate and another wall plate, between a wall plate and a mobile computing device, between a wall plate and a remote computing server, between a wall plate and a local computing device (e.g., a router, a hub, local computer, or the like), or between a wall plate and some other computing device.

The communication of the reporting circuit 280 may be wired communications (e.g., power-line communications (PLC) or another wired communications architecture) or wireless communications (e.g., IEEE 802.11 (e.g., WiFi), cellular, BLUETOOTH, light-based (e.g., infrared), or any other wireless communications. Information from one or more wall plates may be accumulated, consolidated, or otherwise aggregated before, during, or after reporting.

In some cases, communications reported from a wall plate are based on time, and in other cases, such communications are based on one or more events such as a detection of pests. The reporting may include a system-wide unique identifier, location information (e.g., information from a global positioning system, information stored in memory, information encoded in hardware, or the like), detection information, pesticide information, service information, service-needed information, or any other information.

Optional processing may include complex computing software. For example, in some cases, the detection of pests is a calculation of likelihood that pests are present. Such likelihood may use any suitable sensor or other data. Such likelihood may be generated by one or more artificial intelligence or other complex computing methodologies.

Other complex computing may include machine vision computing. In some cases, for example, data from a camera sensor, image sensor, or other light-capture sensor is used to generate a likelihood that pests are present proximate the detection circuitry.

The optional complex computing may generate any suitable prediction of detected pests, abated pests, pesticide replenishment, or other pest-based data. In some cases, but not all cases, the prediction is arranged as a likelihood (e.g., 50% or more likely, 75% or more likely, 90% or more likely, or some other likelihood) of a particular event, condition, or other status. In such determinations, a decision to act or not act may be based on such prediction crossing a particular one or more thresholds.

Other optional processing is of course contemplated.

Processing advances to 712.

At 712, if operations of the system are complete, processing ends at 714. Conversely, if operations of the system are to continue, processing returns to 704.

Having now set forth certain embodiments, further clarification of certain terms used herein may be helpful to providing a more complete understanding of that which is considered inventive in the present disclosure.

In the embodiments of present disclosure, various components and devices of the embodiments may be interchangeably described herein as "coupled," "connected," "attached," and the like. It is recognized that once assembled, the system is stable and operational without constant or continuous human involvement. The materials and the junctions formed at the point where two or more structures meet in the present embodiments are mechanically, structurally, or otherwise joined to an industrially acceptable level.

FIG. 7 includes a data flow diagram illustrating a non-limiting process that may be used by embodiments of a wall plate with pest abatement circuitry. In this regard, each described process may represent a module, segment, or portion of software code, which comprises one or more executable instructions for implementing the specified logical function(s). It should also be noted that in some implementations, the functions noted in the process may occur in a different order, may include additional functions, may occur concurrently, and/or may be omitted.

The figures in the present disclosure illustrate portions of one or more non-limiting computing device embodiments such as one or more components of processor 300. The computing devices may include operative hardware found in conventional computing device apparatuses such as one or more processors, volatile and non-volatile memory, serial and parallel input/output (I/O) circuitry compliant with various standards and protocols, wired and/or wireless networking circuitry (e.g., a communications transceiver), one or more user interface (UI) modules, logic, and other electronic circuitry.

Processing devices, or "processors," as described herein, include central processing units (CPU's), microcontrollers (MCU), digital signal processors (DSP), application specific integrated circuits (ASIC), peripheral interface controllers (PIC), state machines, and the like. Accordingly, a processor as described herein includes any device, system, or part thereof that controls at least one operation, and such a device may be implemented in hardware, firmware, or software, or some combination of at least two of the same. The functionality associated with any particular processor may be centralized or distributed, whether locally or remotely. Processors may interchangeably refer to any type of electronic control circuitry configured to execute programmed software instructions. The programmed instructions may be high-level software instructions, compiled software instructions, assembly-language software instructions, object code, binary code, micro-code, or the like. The programmed instructions may reside in internal or external memory or may be hard-coded as a state machine or set of control signals. According to methods and devices referenced herein, one or more embodiments describe software executable by the processor, which when executed, carries out one or more of the method acts.

The present application discusses several embodiments that include or otherwise cooperate with one or more computing devices. It is recognized that these computing devices are arranged to perform one or more algorithms to implement various concepts taught herein. Each of said algorithms is understood to be a finite sequence of steps for solving a logical or mathematical problem or performing a task. Any or all of the algorithms taught in the present disclosure may be demonstrated by formulas, flow charts, data flow diagrams, narratives in the specification, and other such means as evident in the present disclosure. Along these lines, the structures to carry out the algorithms disclosed herein include at least one processing device executing at least one software instruction retrieved from at least one memory device. The structures may as the case may be, further include suitable input circuits known to one of skill in the art (e.g., keyboards, buttons, memory devices, communication circuits, touch screen inputs, and any other integrated and peripheral circuit inputs (e.g., accelerometers, thermometers, light detection circuits and other such sensors)), suitable output circuits known to one of skill in the art (e.g., displays, light sources, audio devices, tactile devices, control signals, switches, relays, and the like), and any additional circuits or other structures taught in the present disclosure. To this end, every invocation of means or step plus function elements in any of the claims, if so desired, will be expressly recited.

As known by one skilled in the art, a computing device has one or more memories, and each memory comprises any combination of volatile and non-volatile computer-readable media for reading and writing. Volatile computer-readable media includes, for example, random access memory (RAM). Non-volatile computer-readable media includes, for example, read only memory (ROM), magnetic media such as a hard-disk, an optical disk, a flash memory device, a CD-ROM, and/or the like. In some cases, a particular memory is separated virtually or physically into separate areas, such as a first memory, a second memory, a third memory, etc. In these cases, it is understood that the different divisions of memory may be in different devices or embodied in a single memory. The memory in some cases is a non-transitory computer medium configured to store software instructions arranged to be executed by a processor. Some or all of the stored contents of a memory may include software instructions executable by a processing device to carry out one or more particular acts.

The computing devices illustrated herein may further include operative software found in a conventional computing device such as an operating system or task loop, software drivers to direct operations through I/O circuitry, networking circuitry, and other peripheral component circuitry. In addition, the computing devices may include operative application software such as network software for communicating with other computing devices, database software for building and maintaining databases, and task management software where appropriate for distributing the communication and/or operational workload amongst various processors. In some cases, the computing device is a single hardware machine having at least some of the hardware and software listed herein, and in other cases, the computing device is a networked collection of hardware and software machines working together in a server farm to execute the functions of one or more embodiments described herein. Some aspects of the conventional hardware and software of the computing device are not shown in the figures for simplicity.

When so arranged as described herein, each computing device may be transformed from a generic and unspecific computing device to a combination device arranged comprising hardware and software configured for a specific and particular purpose such as to provide a determined technical solution. When so arranged as described herein, to the extent that any of the inventive concepts described herein are found by a body of competent adjudication to be subsumed in an abstract idea, the ordered combination of elements and limitations are expressly presented to provide a requisite inventive concept by transforming the abstract idea into a tangible and concrete practical application of that abstract idea.

Software may include a fully executable software program, a simple configuration data file, a link to additional directions, or any combination of known software types. When a computing device updates software, the update may be small or large. For example, in some cases, a computing device downloads a small configuration data file to as part of a software update, and in other cases, a computing device completely replaces most or all of the present software on itself or another computing device with a fresh version. In some cases, software, data, or software and data is encrypted, encoded, and/or otherwise compressed for reasons that include security, privacy, data transfer speed, data cost, or the like.

Database structures, if any are present in the systems described herein, may be formed in a single database or multiple databases. In some cases, hardware or software storage repositories are shared amongst various functions of the particular system or systems to which they are associated. A database may be formed as part of a local system or local area network. Alternatively, or in addition, a database may be formed remotely, such as within a distributed "cloud" computing system, which would be accessible via a wide area network or some other network.

Input/output (I/O) circuitry and user interface (UI) modules include serial ports, parallel ports, universal serial bus (USB) ports, IEEE 802.11 transceivers and other transceivers compliant with protocols administered by one or more standard-setting bodies, displays, projectors, printers, keyboards, computer mice, microphones, micro-electro-mechanical (MEMS) devices such as accelerometers, and the like.

In at least one embodiment, devices such as the processor 300 may communicate with other devices via communication over a network. The network may involve an Internet connection or some other type of local area network (LAN) or wide area network (WAN). Non-limiting examples of structures that enable or form parts of a network include, but are not limited to, an Ethernet, twisted pair Ethernet, digital subscriber loop (DSL) devices, wireless LAN, Wi-Fi, Worldwide Interoperability for Microwave Access (WiMax), or the like.

In the present disclosure, memory may be used in one configuration or another. The memory may be configured to store data. In the alternative or in addition, the memory may be a non-transitory computer readable medium (CRM). The CRM is configured to store computing instructions executable by a processor of the processor 300. The computing instructions may be stored individually or as groups of instructions in files. The files may include functions, services, libraries, and the like. The files may include one or more computer programs or may be part of a larger computer program. Alternatively, or in addition, each file may include data or other computational support material useful to carry out the computing functions of a wall plate with pest abatement circuitry.

Buttons, keypads, computer mice, memory cards, serial ports, bio-sensor readers, touch screens, and the like may individually or in cooperation be useful to a person operating the wall plate with pest abatement circuitry. The devices may for example, input control information into the system. Displays, printers, memory cards, LED indicators, temperature sensors, audio devices (e.g., speakers, piezo device, etc.), vibrators, and the like are all useful to present output information to the user or users operating or otherwise interested in the wall plate with pest abatement circuitry. In some cases, the input and output devices are directly coupled to the processor 300 and electronically coupled to another processor or other operative circuitry. In other cases, the input and output devices pass information via one or more communication ports (e.g., RS-232, RS-485, infrared, USB, etc.).

As described herein, for simplicity, a user may in some cases be described in the context of the male gender. It is understood that a user can be of any gender, and the terms "he," "his," and the like as used herein are to be interpreted broadly inclusive of all known gender definitions. As the context may require in this disclosure, except as the context may dictate otherwise, the singular shall mean the plural and vice versa; all pronouns shall mean and include the person, entity, firm or corporation to which they relate; and the masculine shall mean the feminine and vice versa.

The terms, "real-time" or "real time," as used herein and in the claims that follow, are not intended to imply instantaneous processing, transmission, reception, or otherwise as the case may be. Instead, the terms, "real-time" and "real time" imply that the activity occurs in a digital fashion over an acceptably short period of time (e.g., over a period of microseconds or milliseconds), and that the activity may be performed on a constant or otherwise digitally ongoing basis (e.g., interrogating a wall plate with pest abatement circuitry to determine pesticide effectiveness, pesticide quantity, pest detection, or the like). An example of an activity that is not real-time is one that occurs over an extended period of time (e.g., hours or days) or that occurs based on intervention or direction by a user or other activity.

In the absence of any specific clarification related to its express use in a particular context, where the terms "substantial" or "about" in any grammatical form are used as modifiers in the present disclosure and any appended claims (e.g., to modify a structure, a dimension, a measurement, or some other characteristic), it is understood that the characteristic may vary by up to 30 percent. For example, a wall plate portion may be described as being formed or otherwise oriented "substantially vertical," In these cases, a wall plate portion that is oriented exactly vertical is oriented along a "Z" axis that is normal (i.e., 90 degrees or at right angle) to a plane formed by an "X" axis and a "Y" axis (e.g., a floor in a room of a building). Different from the exact precision of the term, "vertical," the use of "substantially" to modify the characteristic permits a variance of the "vertical" characteristic by up to 30 percent. Accordingly, a wall plate portion that is oriented "substantially vertical" includes a wall plate portion oriented between 63 degrees and 117 degrees. A wall plate portion that is oriented at 45 degrees of an X-Y plane, however, is not mounted "substantially vertical." As another example, a wall plate portion having a particular linear dimension of "between about three (3) inches and five (5) inches" includes such devices in which the linear dimension varies by up to 30 percent, Accordingly, the particular linear dimension of the wall plate portion as conceived herein may be between one point five (1.5) inches and six point five (6.5) inches.

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both of the limits, ranges excluding either or both of those included limits are also included in the invention.

Unless defined otherwise, the technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein.

In the present disclosure, when an element (e.g., a wall plate portion, a non-operational screw head, a mounting structure, or the like) is referred to as being "on," "coupled to," or "connected to" another element, the elements can be directly on, directly coupled to, or directly connected to each other, or intervening elements may be present. In contrast, when an element is referred to as being "directly on," "directly coupled to," or "directly connected to" another element, there are no intervening elements present.

The terms "include" and "comprise" as well as derivatives and variations thereof, in all of their syntactic contexts, are to be construed without limitation in an open, inclusive sense, (e.g., "including, but not limited to"). The term "or," is inclusive, meaning and/or. The phrases "associated with" and "associated therewith," as well as derivatives thereof, can be understood as meaning to include, be included within, interconnect with, contain, be contained within, connect to or with, couple to or with, be communicable with, cooperate with, interleave, juxtapose, be proximate to, be bound to or with, have, have a property of, or the like.

Reference throughout this specification to "one embodiment" or "an embodiment" and variations thereof means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the present disclosure, the terms first, second, etc., may be used to describe various elements, however, these elements are not be limited by these terms unless the context clearly requires such limitation. These terms are only used to distinguish one element from another. For example, a first machine could be termed a second machine, and, similarly, a second machine could be termed a first machine, without departing from the scope of the inventive concept.

The singular forms "a," "an," and "the" in the present disclosure include plural referents unless the content and context clearly dictates otherwise. The conjunctive terms, "and" and "or" are generally employed in the broadest sense to include "and/or" unless the content and context clearly dictates inclusivity or exclusivity as the case may be. The composition of "and" and "or" when recited herein as "and/or" encompasses an embodiment that includes all of the elements associated thereto and at least one more alternative embodiment that includes fewer than all of the elements associated thereto.

In the present disclosure, conjunctive lists make use of a comma, which may be known as an Oxford comma, a Harvard comma, a serial comma, or another like term. Such lists are intended to connect words, clauses or sentences such that the thing following the comma is also included in the list.

The headings and Abstract of the Disclosure provided herein are for convenience only and do not interpret the scope or meaning of the embodiments.

The pest abatement wall plate systems, devices, and methods described in the present disclosure provide several technical effects and advances to the field of pest infestation.

The wall plate with pest abatement circuitry systems, devices, and methods described in the present disclosure provide several technical effects and advances to the field of pest infestation. Technical effects and benefits include the ability to detect the presence of pests found in a structure such as a living space. In some cases, additional technical effects and benefits include the ability to reduce the number of pests found in a structure such as a living space. Detecting and reducing such pests, or eliminating them altogether, helps prevent the spread of disease, reduces the risk of electrical disruption, and reduces the risk of fire. Other technical effects and benefits may also be achieved.

The inventors have recognized that undesirable insects are pests that gain access to interior building spaces through the electrical infrastructure of the structure. The pests may move freely within the walls of the structure, sometimes following the paths of electrical conduits constructed within the walls. The pests may pass through, nest, or otherwise congregate in electrical boxes, and the pests may gain access to the space inside the structure via a gap between a wall plate and its corresponding electrical box or via an aperture in the wall plate that is intentionally present to expose a portion of the electrical fixture (e.g., a toggle of a light switch) that is mounted in the electrical box. Systems, devices, and methods that detect, reduce, or eliminate pests are therefore desirable.

In at least one embodiment described in the present disclosure, a pest abatement wall plate includes a wall plate portion and a hosting platform. The hosting platform may be a single structure or a plurality of structures. The hosting platform may be used to stage electronic circuitry. The electronic circuitry may detect pest activity, report pest activity, or work to reduce or eliminate pest activity. The hosting platform may also be used to stage a pesticide that undesirable pests may walk through, crawl through, touch, consume, or otherwise contact. The pesticide may exterminate the contacting pest directly in some cases. Alternatively, or in addition, a pest that contacts the pesticide may bring some or all of the pesticide to a nest or other location where two or more pests may be found, and this migration of pesticide acts to exterminate additional pests.

The present disclosure sets forth details of various structural embodiments that may be arranged to carry the teaching of the present disclosure. By taking advantage of the structures described herein, several exemplary devices, systems, and methods are now disclosed.

Example A-1 is a wall plate with pest abatement circuitry, comprising: a wall plate portion structured to cover an electrical box, the wall plate portion being formed substantially from a plastic material and having an inner surface and an outer surface, wherein the inner surface is adjacent to an inside volume of the electrical box when the wall plate with pest abatement circuitry is deployed; and a hosting platform proximate the inner surface of the wall plate, the hosting platform arranged to stage the pest abatement circuitry.

Example A-2 may include the subject matter of Example A-1, and alternatively or additionally any other example herein, wherein the pest abatement wall plate further comprises a pest detection circuit that is based on motion of a pest, sound of the pest, vibration of the pest, electrical resistance of the pest, or electrical capacitance of the pest.

Example A-3 may include the subject matter of Example A-2, and alternatively or additionally any other example herein, wherein the pest abatement circuitry further comprises a pest reporting circuit, which, after a pest is detected, provides a report indicating the detection of the pest.

Example A-4 may include the subject matter of Example A-3, and alternatively or additionally any other example herein, wherein the pest reporting circuit includes at least one of a light source and an audio source.

Example A-5 may include the subject matter of Example A-4, and alternatively or additionally any other example herein, wherein the pest reporting circuit includes at least one communications circuit.

Example A-6 may include the subject matter of Example A-5, and alternatively or additionally any other example herein, wherein the pest abatement circuitry further comprises a power supply, the power supply having at least one of a power storage device, a power conversion circuit, and a power regulation circuit.

Example A-7 may include the subject matter of Example A-6, and alternatively or additionally any other example herein, wherein the pest abatement circuitry further comprises a processor circuit arranged to control operations of the pest abatement circuitry; and a memory circuit, the memory circuit including software instructions, which, when executed by the processor circuit, carry out operations of the wall plate with pest abatement circuitry.

Example A-8 may include the subject matter of Example A-7, and alternatively or additionally any other example herein, wherein the operations of the wall plate with pest abatement circuitry comprises detecting a suspected presence of at least one pest within the inside volume of the electrical box; and directing activation of a human perceptible output based on the detecting.

Example A-9 may include the subject matter of Example A-8, and alternatively or additionally any other example herein, wherein the operations of the wall plate with pest abatement circuitry comprises detecting a suspected presence of at least one pest within the inside volume of the electrical box; and communicating an indication of the suspected presence to a remote computing device.

Example A-10 may include the subject matter of Example A-9, and alternatively or additionally any other example herein, wherein the operations of the wall plate with pest abatement circuitry comprises detecting a suspected presence of at least one pest within the inside volume of the electrical box; and maintaining a count of detecting the suspected presence events.

Example A-11 may include the subject matter of Example A-10, and alternatively or additionally any other example herein, wherein the operations of the wall plate with pest abatement circuitry comprises detecting a suspected presence of at least one pest within the inside volume of the electrical box; based on repeated acts of detecting, matching a pattern of pest activity; and based on matching the pattern, identifying a likely type of pest whose suspected presence has been detected.

Example A-12 may include the subject matter of Example A-11, and alternatively or additionally any other example herein, wherein the wall plate with pest abatement circuitry further comprises a second hosting platform proximate the inner surface of the wall plate, the second hosting platform arranged to stage a pesticide; a processor circuit arranged to control operations of the pest abatement circuitry; and a memory circuit, the memory circuit including software instructions, which, when executed by the processor, carry out operations of the wall plate with pest abatement circuitry wherein the operations of the wall plate with pest abatement circuitry include: detecting a suspected presence of at least one pest within the inside volume of the electrical box; and activating a heating element proximate the second hosting platform based on the detecting.

Example B-1 is a wall plate with pest abatement circuitry method, comprising: providing a wall plate structured to cover an electrical box, the wall plate being formed substantially from a plastic material and having an inner surface and an outer surface, wherein the inner surface is adjacent to an inside volume of the electrical box, the wall plate having integrated thereon a processor circuit and a memory circuit, the memory circuit including software instructions, which, when executed by the processor, cause the pest abatement circuitry to: detect a suspected presence of at least one pest within the inside volume of the electrical box.

Example B-2 may include the subject matter of Example B-1, and alternatively or additionally any other example herein, wherein the software instructions, which, when executed by the processor, further cause the pest abatement circuitry to: activate a heating element proximate a pesticide located proximate the inner surface of the wall plate.

Example B-3 may include the subject matter of Example B-2, and alternatively or additionally any other example herein, wherein the software instructions, which, when executed by the processor, further cause the pest abatement circuitry to: communicate an indication of the suspected presence to a remote computing device.

Example B-4 may include the subject matter of Example B-3, and alternatively or additionally any other example herein, wherein the software instructions, which, when executed by the processor, further cause the pest abatement circuitry to: communicate a count of detected suspected presence events to a remote computing device.

Example C-1 is a system, comprising: a plurality of wall plates, each wall plate structured to cover a respective electrical box, each wall plate being formed substantially from a plastic material and having an inner surface and an outer surface, wherein the inner surface is adjacent to an inside volume of its respective electrical box, each wall plate having a hosting platform proximate the inner surface of the wall plate, the hosting platform arranged to stage pest abatement circuitry, said pest abatement circuitry including: a detection circuit; a power supply; a processor circuit; and at least one memory circuit, the memory circuit including software instructions, which, when executed by the processor circuit, carry out operations to detect a suspected presence of at least one pest within the inside volume of the respective electrical box.

Example C-2 may include the subject matter of Example C-1, and alternatively or additionally any other example herein, wherein each wall plate further comprises: a pest detection circuit that is based on motion of a pest, sound of the pest, vibration of the pest, electrical resistance of the pest, or electrical capacitance of the pest.

Example C-3 may include the subject matter of Example C-2, and alternatively or additionally any other example herein, wherein each wall plate further comprises: a pest reporting circuit, which, after a pest is detected, provides a report indicating the detection of the pest.

Example C-4 may include the subject matter of Example C-3, and alternatively or additionally any other example herein, wherein the pest reporting circuit of each wall plate includes a wireless communications circuit arranged to communicate pest detection information to a remote computing system.

Example C-5 may include the subject matter of Example C-4, and alternatively or additionally any other example herein, wherein the pest abatement circuitry further includes at least one pest abatement circuitry interface, the at least one pest abatement circuitry interface including a light source, an audio source, a tactile source, a vibrator, an aperture, or any other indicator or structure that facilitates some form of indicator.

Example D-1 is a pest abatement wall plate, comprising a wall plate portion structured to cover an electrical box, the wall plate portion being formed substantially from a plastic material and having an inner surface and an outer surface, wherein the inner surface is adjacent to an inside volume of the electric box when the pest abatement wall plate is deployed; and a hosting platform proximate the inner surface of the wall plate, the hosting platform arranged to stage a pesticide.

Example D-2 may include the subject matter of Example D-1, and alternatively or additionally any other example herein, wherein the pest abatement wall plate further comprises a mounting structure; and a hinge connecting the mounting structure to the wall plate portion.

Example D-3 may include the subject matter of Example D-2, and alternatively or additionally any other example herein, wherein the wall plate portion is arranged for placement about a standard duplex electrical outlet.

Example D-4 may include the subject matter of Example D-3, and alternatively or additionally any other example herein, wherein the wall plate portion is arranged for placement about a standard single pole toggle switch.

Example D-5 may include the subject matter of Example D-4, and alternatively or additionally any other example herein, wherein the wall plate portion is arranged for placement about a standard rectangular electrical fixture.

Example D-6 may include the subject matter of Example D-5, and alternatively or additionally any other example herein, wherein the electrical box is a single-gang electrical box.

Example D-7 may include the subject matter of Example D-6, and alternatively or additionally any other example herein, wherein the electrical box is a multi-gang electrical box.

Example D-8 may include the subject matter of Example D-7, and alternatively or additionally any other example herein, wherein the hosting platform is arranged as a well.

Example D-9 may include the subject matter of Example D-8, and alternatively or additionally any other example herein, wherein the hosting platform is arranged as a protuberance having a substantially planar surface that is substantially perpendicular to the inner surface of the wall plate portion.

Example D-10 may include the subject matter of Example D-9, and alternatively or additionally any other example herein, wherein the hosting platform and the wall plate portion are formed as a single structure.

Example D-11 may include the subject matter of Example D-10, and alternatively or additionally any other example herein, wherein the mounting structure has single aperture arranged to receive a screw, said screw arranged to secure the mounting structure to a central portion of a standard duplex outlet.

Example D-12 may include the subject matter of Example D-11, and alternatively or additionally any other example herein, wherein the mounting structure includes a first substructure having a first aperture arranged to receive a first screw and a second substructure having a second aperture arranged to receive a second screw, said first and second screws arranged to secure the mounting structure to first and second portions of an electrical switch.

Example D-13 may include the subject matter of Example D-12, and alternatively or additionally any other example herein, wherein the mounting structure is formed substantially from metal.

Example D-14 may include the subject matter of Example D-13, and alternatively or additionally any other example herein, wherein the mounting structure is formed substantially from a plastic.

Example D-15 may include the subject matter of Example D-14, and alternatively or additionally any other example herein, wherein the hosting platform is integrated with, or connected to, the mounting structure.

Example D-16 may include the subject matter of Example D-15, and alternatively or additionally any other example herein, wherein the hinge is has a piano hinge structure.

Example D-17 may include the subject matter of Example D-16, and alternatively or additionally any other example herein, wherein the hinge is a living hinge.

Example D-18 may include the subject matter of Example D-17, and alternatively or additionally any other example herein, wherein the wall plate portion, the mounting structure, and the hinge are formed as a single structure.

Example E-1 is a pest abatement wall plate, comprising a wall plate means structured to cover an electrical box, the wall plate means having an inner surface and an outer surface, wherein the inner surface is adjacent to an inside volume of the electrical box when the pest abatement wall plate is deployed; and a hosting platform means proximate the inner surface of the pest abatement wall plate, the hosting platform arranged to stage a pesticide.

Example F-1 is a method of pest abatement, comprising securing a mounting structure of a pest abatement wall plate to an electrical fixture that is mounted in an electrical box; applying a pesticide to a hosting platform of the pest abatement wall plate; and rotating a wall plate portion of the pest abatement wall plate to close the pest abatement wall plate and cover an open area of the electrical box.

U.S. Provisional Application No. 63/267,607, filed Feb. 7, 2022 and naming the same inventors as the present application, is hereby incorporated by reference in its entirety.

International Patent Application No. PCT/US2023/062164, filed Feb. 7, 2023, is hereby incorporated by reference in its entirety.

This application claims the benefit of priority to the fullest extent allowed by law to U.S. Provisional Application No. 63/479,343, filed Jan. 10, 2023, which application is hereby incorporated by reference in its entirety.

The various embodiments described above can be combined to provide further embodiments. Aspects of the embodiments can be modified, if necessary to employ concepts of the various patents, application and publications to provide yet further embodiments.

In the description herein, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order to avoid obscuring the description with unnecessary detail. Thus, the present disclosure is not intended to be limited to the embodiments shown but is instead to be accorded the widest scope consistent with the principles and features disclosed herein. Hence, these and other changes can be made to the embodiments in light of the above-detailed description. In general, in the following claims, the terms used should not be construed to limit the claims to the specific embodiments disclosed in the specification but should be construed to include all possible embodiments along with the full scope of equivalents to which such claims are entitled. Accordingly, the claims are not limited by the disclosure.

The invention claimed is:

1. A wall plate with pest abatement circuitry, comprising:

a wall plate portion structured to cover an electrical box, the wall plate portion being formed substantially from a plastic material and having an inner surface and an outer surface, wherein the inner surface is adjacent to an inside volume of the electrical box when the wall plate with pest abatement circuitry is deployed; and a hosting platform proximate the inner surface of the wall plate, the hosting platform arranged to stage the pest abatement circuitry.

2. The wall plate with pest abatement circuitry of claim 1, wherein the pest abatement circuitry further comprises:

a pest detection circuit that is based on motion, sound, vibration, electrical resistance, or a change in electrical capacitance attributable to a presence of a pest.

3. The wall plate with pest abatement circuitry of claim 1, wherein the pest abatement circuitry further comprises:

a pest reporting circuit, which, after a pest is detected, provides a report indicating detection of the pest.

4. The wall plate with pest abatement circuitry of claim 3 wherein the pest reporting circuit includes at least one of a light source and an audio source.

5. The wall plate with pest abatement circuitry of claim 3, wherein the pest reporting circuit includes at least one communications circuit.

6. The wall plate with pest abatement circuitry of claim 1, wherein the pest abatement circuitry further comprises:

a power supply, the power supply having at least one of a power storage device, a power conversion circuit, and a power regulation circuit.

7. The wall plate with pest abatement circuitry of claim 1, wherein the pest abatement circuitry further comprises:

a processor circuit arranged to control operations of the pest abatement circuitry; and a memory circuit, the memory circuit including software instructions, which, when executed by the processor circuit, carry out operations of the wall plate with pest abatement circuitry.

8. The wall plate with pest abatement circuitry of claim 7, wherein the operations of the wall plate with pest abatement circuitry comprises:

detecting a suspected presence of at least one pest within the inside volume of the electrical box; and directing activation of a human perceptible output based on the detecting.

9. The wall plate with pest abatement circuitry of claim 7, wherein the operations of the wall plate with pest abatement circuitry comprises:

detecting a suspected presence of at least one pest within the inside volume of the electrical box; and communicating an indication of the suspected presence to a remote computing device.

10. The wall plate with pest abatement circuitry of claim 7, wherein the operations of the wall plate with pest abatement circuitry comprises:

detecting a suspected presence of at least one pest within the inside volume of the electrical box; and maintaining a count of detecting the suspected presence events.

11. The wall plate with pest abatement circuitry of claim 7, wherein the operations of the wall plate with pest abatement circuitry comprises:

detecting a suspected presence of at least one pest within the inside volume of the electrical box;

based on repeated acts of detecting, matching a pattern of pest activity; and based on matching the pattern, identifying a likely type of pest whose suspected presence has been detected.

12. The wall plate with pest abatement circuitry of claim 1, further comprising:

a second hosting platform proximate the inner surface of the wall plate, the second hosting platform arranged to stage a pesticide;

a processor circuit arranged to control operations of the pest abatement circuitry; and a memory circuit, the memory circuit including software instructions, which, when executed by the processor, carry out operations of the wall plate with pest abatement circuitry wherein the operations of the wall plate with pest abatement circuitry include:

detecting a suspected presence of at least one pest within the inside volume of the electrical box; and activating a heating element proximate the second hosting platform based on the detecting.

13. A wall plate with pest abatement circuitry method, comprising:

providing a wall plate structured to cover an electrical box, the wall plate being formed substantially from a plastic material and having an inner surface and an outer surface, wherein the inner surface is adjacent to an inside volume of the electrical box, the wall plate having integrated therewith a hosting platform, the hosting platform staging the pest abatement circuitry and the pest abatement circuitry including a processor circuit and a memory circuit, the memory circuit storing software instructions, which, when executed by the processor, cause the pest abatement circuitry to:

detect a suspected presence of at least one pest within the inside volume of the electrical box.

14. The method of claim 13, wherein the software instructions, which, when executed by the processor, further cause the pest abatement circuitry to:

activate a heating element proximate a pesticide located proximate the inner surface of the wall plate.

15. The method of claim 13, wherein the software instructions, which, when executed by the processor, further cause the pest abatement circuitry to:

communicate an indication of the suspected presence to a remote computing device.

16. The method of claim 13, wherein the software instructions, which, when executed by the processor, further cause the pest abatement circuitry to:

communicate a count of detected suspected presence events to a remote computing device.

17. A system, comprising:

a plurality of wall plates, each wall plate structured to cover a respective electrical box, each wall plate being formed substantially from a plastic material and having an inner surface and an outer surface, wherein the inner surface is adjacent to an inside volume of its respective electrical box, each wall plate having a hosting platform proximate the inner surface of the wall plate, the hosting platform arranged to stage pest abatement circuitry, said pest abatement circuitry including:

a detection circuit;

a power supply;

a processor circuit; and at least one memory circuit, the memory circuit including software instructions, which, when executed by the processor circuit, carry out operations to detect a suspected presence of at least one pest within the inside volume of the respective electrical box.

18. The system of 17, wherein each wall plate further comprises:

a pest detection circuit that is based on motion, sound, vibration, electrical resistance, or a change in electrical capacitance attributable to a presence of a pest.

19. The system of 17, wherein each wall plate further comprises:

a pest reporting circuit, which, after the suspected presence of at least one pest is detected, provides a report indicating the suspected presence of at least one pest.

20. The system of 17 wherein the pest reporting circuit of each wall plate includes a wireless communications circuit arranged to communicate pest detection information to a remote computing system.

* * * * *